United States Patent [19]

Miyake et al.

[11] Patent Number: 5,514,740
[45] Date of Patent: May 7, 1996

[54] NEAR-INFRARED ABSORBING TRANSPARENT RESIN COMPOSITION AND ARTICLE MOLDED THEREFROM

[75] Inventors: Yuji Miyake, Hyogo; Sakae Takahashi, Ossaka, both of Japan

[73] Assignee: Daicel Chemical Industries, Ltd., Osaka, Japan

[21] Appl. No.: 362,759

[22] Filed: Dec. 22, 1994

Related U.S. Application Data

[63] Continuation of Ser. No. 108,891, Aug. 18, 1993, abandoned.

[30] Foreign Application Priority Data

Aug. 27, 1992 [JP] Japan .................................. 4-228725

[51] Int. Cl.⁶ ...................................................... C08K 3/30
[52] U.S. Cl. .................... 524/420; 524/413; 252/582; 252/584; 252/587; 106/1.23
[58] Field of Search ............................ 524/413, 420; 252/582, 584, 587; 106/1.23

[56] References Cited

U.S. PATENT DOCUMENTS

| | | | |
|---|---|---|---|
| 3,692,688 | 9/1972 | Castellion et al. | 252/587 |
| 4,755,394 | 7/1988 | Aoki et al. | 427/123 |
| 4,863,635 | 9/1989 | Lehr | 252/518 |
| 5,037,575 | 8/1991 | Miura et al. | 252/299.1 |
| 5,236,633 | 8/1993 | Satake et al. | 252/587 |

FOREIGN PATENT DOCUMENTS

| | | |
|---|---|---|
| 60-21294 | 2/1985 | Japan . |
| 60-42269 | 9/1985 | Japan . |
| 61-115958 | 6/1986 | Japan . |

OTHER PUBLICATIONS

Derwent Abstracts of 3 Japanese references listed above (2 sheets) English.

Family data of 3 Japanese references listed above (1 sheet).

*Primary Examiner*—Paul R. Michl
*Assistant Examiner*—John J. Guarriello
*Attorney, Agent, or Firm*—Flynn, Thiel, Boutell & Tanis

[57] ABSTRACT

A near-infrared absorbing transparent resin composition prepared by melt-kneading 100 parts by weight of a transparent resin, 0.01 to 5 parts by weight of cupric sulfide and, if necessary, further 0.001 to 1 part by weight of a specific thiourea derivative and/or 0.001 to 1 part by weight of a specific amide derivative, and a molded article of a near-infrared absorbing transparent resin produced by molding the above composition into a sheet or film.

8 Claims, No Drawings

NEAR-INFRARED ABSORBING TRANSPARENT RESIN COMPOSITION AND ARTICLE MOLDED THEREFROM

This application is a continuation U.S. Ser. No. 08/108,891, filed Aug. 18, 1993, now abandoned.

FIELD OF THE INVENTION

The present invention relates to a near-infrared absorbing material. A near-infrared absorbing material is a functional material on which active research and development have recently been made and which can be utilized as photosensitive material for an semiconductor laser and other light sources having a wavelength within the near-infrared region, information-recording material for an optical disk, optical material such as an infrared filter or film, or heat absorbing glazing material.

DESCRIPTION OF THE RELATED ART

Up to this time, a substantially haze-free material, excellent in near-infrared absorption, which is prepared by dissolving tungsten hexachloride ($WCl_6$) and tin chloride ($SnCl_2 \cdot 2H_2O$) in a methyl methacrylate syrup, (monomer) and polymerizing the syrup has been known as a near-infrared absorbing and a light transmitting material as described in U.S. Pat. No. 3,692,688.

Further examples of the near-infrared absorbing material which has been developed include chromium and cobalt complex salts disclosed in JP-B 60-42269, thiol-nickel complexes disclosed in JP-A 60- 21294, anthraquinone derivatives disclosed in JP-A 61- 115958, and novel squarylium compounds exhibiting maximum absorption within a wavelength range of 700 to 800 nm as disclosed in U.S. Pat. No. A 5,037,575.

Among the near-infrared absorbing materials of the prior art, the organic materials have a problem that their endurance is so poor that the initial absorption performance is lower owing to changes in the environmental condition or a lapse of time, while most of the complex materials also have a problem that they absorb not only near-infrared rays but also visible rays to cause deep coloration, thus being limited in their uses, though they are excellent in endurance. Further, both organic and complex materials of the prior art had a property that an absorption peak was found only at a specific wavelength and no absorption performance was exhibited at any wavelength off the above specific wavelength. When, therefore, a recording medium using a laser beam having a wavelength within the near infrared region as a light source is produced by utilizing such a material, the wavelength of the laser must be adjusted to that of the absorption peak of the material. However, there have been found few combinations of a laser with a near-infrared absorbing material wherein the wavelength of the laser is equal to that of the absorption peak of the material, because not many lasers, different in wavelength, nor many near-infrared absorbing materials, different in absorption peak wavelength have been known.

Although the above composition of the prior art, prepared by dissolving $WCl_6$ and $SnCl_2 \cdot 2H_2O$ in a methyl methacrylate syrup has a property of being colored deeply blue and it absorbs near-infrared rays well, it also has a problem of fading when left standing in a dark place for a long period. Such a slowly progressing photochromism is unfavorable for providing an industrial product such as an optical filter or heat absorbing glazing material with constant quality.

SUMMARY OF THE INVENTION

The inventors of the present invention have intensively studied to find that a near-infrared absorbing material which exhibits uniform absorption performance over the entire near-infrared region of 800 to 2000 nm, is little discolored and is excellent in endurance can be prepared by incorporating cupric sulfide either alone or together with a specific thiourea derivative and/or a specific amide derivative into a transparent resin. The present invention has been accomplished on the basis of this finding.

Namely, the present invention relates to a transparent resin composition excellent in near-infrared absorption which comprises (A) 100 parts by weight of a transparent resin and (B) 0.01 to 5 parts by weight of cupric sulfide. Further, the present invention also relates to a transparent resin composition excellent in near-infrared absorption which comprises (A) 100 parts by weight of a transparent resin, (B) 0.01 to 5 parts by weight of cupric sulfide and (C) 0.001 to 1 part by weight of at least one thiourea derivative selected from among those represented by the following formula (I):

wherein $R_1$, $R_2$ and $R_3$ each represent a monovalent group selected from the group consisting of hydrogen, alkyl, cycloalkyl, aryl and aralkyl groups and residues of 5- and 6-membered heterocycles, each of which may have one or more substituents, or alternatively $R_2$ and $R_2$ or $R_2$ and $R_3$ may be united together to form a ring, and/or 0,001 to 1 part by weight of at least one amide derivative selected from among those represented by the general formula (II):

wherein $R_4$ and $R_5$ each represent a monovalent group selected from the group consisting of hydrogen, alkyl, alkenyl, cycloalkyl, aryl and aralkyl groups and residues of 5- and 6-membered heterocycles, or $R_4$ is defined above and $R_5$ also represents an alkoxy group, with the proviso that each of these monovalent groups may have one or more substituents, or alternatively $R_4$ and $R_5$ may be united together to form a ring.

Furthermore, the present invention provides a molded article of a near-infrared absorbing transparent resin produced by molding the above transparent resin composition excellent in near-infrared absorption into a sheet or film.

The transparent resin (A) is transparent to visible light having wave length of 380 to 780 nm. It is preferable that cupric sulfide has an average size of 0.2 to 12 microns. In the formulae (I) and (II) for the component (C), it is preferable that $R_1$ to $R_5$ have zero to 22 carbon atoms; the heterocycles are a 5- or 6-membered cyclic group including nitrogen atom and/or sulfur atom; the substituent includes a halogen, hydroxy, amino, nitro and phenyl; the cyclic compound (I) is formed by $R_1$ and $R_2$ and thiourea group, $R_1$ and $R_2$ being hydrocarbon, and is a saturated or unsaturated, 5- or 6-membered ring; a 5- or 6membered, nitrogen-containing ring is formed by $R_2$, N and $R_3$ and may include a sulfur atom; a saturated or unsaturated, 5- to 7-membered lactam compound is formed by $R_4$, $R_5$ and an amino group.

The transparent resin to be used in the present invention includes polycarbonate, styrenine, methacrylate, vinyl chloride, polyolefinic, polyester, polyamide and unsaturated polyester resins, though the resin is not limited to them. Polysulfone and polyarylate may be used here.

The above polycarbonate resin is one prepared from a dihydric alcohol and a carbonate precursor by the solution or melt process, and representative examples of the dihydric alcohol include 2,2-bis( 4-hydroxyphenyl)propane i.e. bisphenol A, bis( 4-hydroxyphenyl)methane, 1,1-bis(4-hydroxyphenyl)cyclohexane, 2,2-bis(4-hydroxy-3,5-dimethylphenyl)propane, 2,2-bis(4-hydroxy-3,5-methylphenyl)propane, bis(4-hydroxyphenyl) sulfide and bis(4-hydroxyphenyl) sulfone. Preferred examples thereof include bis( 4-hydroxyphenyl)alkanes, among which one mainly comprising bisphenol A is particularly preferable. On the other hand, examples of the carbonate precursor include carbonyl halides, carbonyl esters and haloformates. Specifically, the carbonate precursor may be phosgene, diphenyl carbonate, dihaloformate of a dihydric phenol or a mixture of two or more of them.

The above styrenic resin is one prepared by copolymerizing at least one styrenic monomer with at least one vinyl monomer copolymerizable therewith, if necessary, in the presence of a rubbery substance. The term "styrenic monomer" as used herein refers to a generic name for styrene, α-methylstyrene and styrene derivatives wherein a hydrogen atom of the benzene ring is replaced by a halogen atom or an alkyl group having 1 or 2 carbon atoms, and representative examples of the styrenic monomer include styrene, o-chlorostyrene, p-methylstyrene, 2,4-dimethylstyrene and t-butylstyrene. On the other hand, representative examples of the above vinyl monomer include acrylonitrile monomers such as (meth)acrylonitrile, α-chloroacrylonitrile and vinylidene cyanide; (meth)acrylic acid and esters thereof, such as (meth)acrylic acid, methyl (meth)acrylate, ethyl (meth)acrylate, butyl (meth)acrylate, glycidyl (meth)acrylate, 2-ethylhexylbutyl (meth)acrylate and β-hydroxyethyl (meth)acrylate; vinyl acetate; vinyl chloride; vinylidene chloride; vinyl-pyrrolidone; (meth)acrylamide; maleic anhydride; itaconic arthydride; maleimide; vinyl ketones; and vinyl ethers. Further, representative examples of the above rubbery substance include polybutadiene rubber, styrene-butadiene-styrene block copolymer rubber, ethylenepropylene terpolymer rubber, butadiene-acrylonitrile copolymer rubber, butyl rubber, acrylic rubber, styrene-isoprene-butadiene copolymer rubber, and rubbers comprising a conjugated 1,3-diene monomer such as isoprene or chloroprene which are represented by an isoprene-acrylic acid ester copolymer rubber. These rubbers are used each alone or as a mixture of two or more of them.

The above methacrylate resin is one prepared from methyl methacrylate or a monomer mixture comprising methyl methacrylate as the principal monomer and a comonomer copolymerizable therewith, and specific examples of the comonomer include (meth)acrylic acid (meaning acrylic or methacrylic acid, the same applies hereinafter), methyl acrylate, ethyl (meth)acrylate, propyl (meth)acrylate, butyl (meth)acrylate, cyclohexyl (meth)acrylate, 2-ethylhexyl (meth)acrylate, ethylene glycol di(meth)acrylate, diethylene glycol di(meth)acrylate, tetraethylene glycol di(meth)acrylate, trimethylolethane tri(meth)acrylate, trimethylolpropane tri(meth)acrylate, pentaerythritol tetra(meth)acrylate, neopentyl glycol di(meth)acrylate, allyl (meth)acrylate and hydroxyethyl (meth)acrylite. When a monomer mixture comprising methyl methacrylate as the principal monomer is used as the starting material, it is desirable that the monomer mixture contain at least 50% by weight, preferably at least 60% by weight of methyl methacrylate. The process for preparing a syrup comprising methyl methacrylate or a monomer mixture comprising methyl methacrylate as the principal monomer and a polymer thereof includes a process of preparing a partial polymer by conventional bulk prepolymerization and a process of dissolving a polymer in a monomer (mixture). It is preferable from the viewpoint of easiness in casting that the syrup have a polymer content of 35% or below. Further, methacrylate resins prepared by other representative polymerization processes such as suspension, emulsion or solution polymerization can also be used in the present invention.

The above vinyl chloride resin is preferably a vinyl chloride homopolymer excellent in heat stability, tensile strength and heat resistance, though it may be a vinyl chloride copolymer or graft copolymer prepared by copolymerizing vinyl chloride with a small amount of a comonomer, or a polymer blend comprising a vinyl chloride resin and a small amount of a resin well compatible therewith, such as vinylidene chloride, ethylene-vinyl acetate copolymer or chlorinated polyethylene. Further, a mixture of two or more of these (co)polymers and polymer blends may be used.

The above polyolefinic resin is an α-olefin homopolymer or a copolymer comprising an α-olefin as the principal monomer and other comonomer and examples thereof include polyethylene, polypropylene, ethylenepropylene copolymer, ethylene-butene copolymer, ethylene-4-methyl-1-pentene copolymer, ethylene-vinyl acetate copolymer and ethylene-acrylic acid copolymer. Among these polyolefinic resins, low-density polyethylene having a density of 0.910 to 0.935, ethylene-α-olefin copolymer and ethylene-vinyl acetate copolymer having a vinyl acetate content of 30% by weight or below are preferable for the production of agricultural films from the viewpoints of transparency, weathering resistance and cost. Further, an ethylene vinyl acetate copolymer having a vinyl acetate content of 5 to 30% by weight is still preferable from the viewpoints of transparency, flexibility and weathering resistance.

Examples of the above polyamide and polyester resins include nylon 6, nylon 66, nylon 12, nylon 46, polyethylene terephthalate, polybutylene terephthalate, polyacrylate (sic) and polyether ether ketone (sic).

The cupric sulfide to be used in the present invention may be a powdery one prepared by the conventional process, the mean particle diameter of which is preferably 12 μm or below, still preferably 10 μm or below. It is desirable that the cupric sulfide does not contain any particle having a diameter of 20 μm or above in substance. When cupric sulfide having a mean particle diameter above this upper limit is used, it will not only deteriorate the appearance of the obtained molded article to thereby deteriorate the transmissibility of parallel rays of light as the result of the surface unevenness of the article, but also deteriorate the properties and near-infrared absorption of the molded article unfavorably.

Examples of the thiourea derivative represented by the general formula (I) to be used in the present invention are as follows, though the derivative is not limited to them:

1-ethyl-3-phenylthiourea, 1,3-diphenylthiourea, 1,3-diethylthiourea, 1-ethyl-3-p-chlorophenylthiourea, 1-ethyl-3-(2-hydroxyethyl)thiourea, 1-(2-thiazolyl)-3-phenylthiourea, 1,3-distearylthiourea, 1,3-dibehenylthiourea, 1-ethylthiourea, 1-p-bromophenyl-3-phenylthiourea, 1-(2-thiophenyl)-3-phenylthiourea, 1,3-bis(2-hydroxyethyl)thiourea, 1-p-aminophenyl-3-phenylthiourea, 1-p-nitrophenyl-3-phenylthiourea, 1-p-hydroxyphenyl-8-phenylthiourea, 1,3-di-m-chlorophenylthiourea, ethylenethioarea, thiourea sic, 1-methyl-3-p-hydroxyphenylthiourea, 1-phenylthiourea, 1-m-nitrophenylthiourea, 1-p-nitrophenylthiourea, 1-p-aminophenylthiourea, 1,3-dimethylthioirea, 1,3-dicyclohexylthiourea, 1-phenyl-3-p-chloropienylthiourea, 1-phenyl-3-p-methoxyphenylthiourea, 1,1-diphenylthiourea, 1,1-dibenzyl-3-phenethylthiourea and 1-phenyl-3-(2-hydroxyethyl)thiourea.

Examples of the amide derivative represented by the general formula (II) to be used in the present invention and as follows, though the derivative is not limited to them:

N-methylbenzamide, N-phenylbenzamide, N-phenylstearamide, N-ethylethylamide (sec), N-ethyl-p-chlorobenzamide, N-propylbenzamide, N-ethylstearamide, N-1-(2-thiazolyl)benzamide, N-stearylstearamide, N-behenylbehenylamide, acetamide, N-phenyl-p-bromobenzamide, N-behenylacetamide, N-p-aminophenylbenzamide, N-p-nitrophenylbenzamide, N-p-hydroxyphenylbenzamide, N-m-chlorophenylbenzamide, nicotinamide, acetanilide, O-ethyl-N-phenyl(carbamate) (sic), benzamide, m-nitrobenzamide, p-nitrobenzamide, p-aminobenzamide, N-methylacetamide, N-cyclohexylbenzamide, N-chlorophenylbenzamide, N-p-methoxyphenylbenzamide and N-stearylbenzamide.

According to the present invention, the amount of cupric sulfide to be used and those of the thiourea and/or amide derivatives to be used may be varied depending upon the objective visual and near-infrared transmittances. The amount of cupric sulfide to be added is 0.01 to 5 parts by weight, preferably 0.02 to 3.0 parts by weight per 100 parts by weight of the transparent resin. The amount of the thiourea or amide derivative to be added is 0.001 to 1 part by weight, preferably 0.002 to 0.5 part by weight per 100 parts by weight of the transparent resin. When the resin material obtained in the present invention is, e.g., a plate, the transmittance of the plate varies depending upon the thickness thereof, even when the resin material contains the above additives in constant amounts. Accordingly, the amounts of the additives must be so adjusted that the material exhibits a desired transmittance in its final form, i.e., in the form of a plate having an objective thickness.

When the amount of cupric sulfide to be added and that of the thiourea or amide derivative to be added are less then 0.01 and less than 0.001 part by weight, respectively, per 100 parts by weight of the transparent resin, the resulting composition will not be sufficiently improved in near-infrared absorption performance, while when the amount of cupric sulfide to be added exceeds 5 parts by weight or that of the thiourea or amide derivative exceeds 1 part by weight, the resulting composition will not be improved in near-infrared absorption performance and will be in danger of hazing.

In the present invention, it is effective in facilitating the dispersion of cupric sulfide to add a dispersant, for example, a sorbitan/fatty acid ester such as sorbitan monostearate or a glycerin/fatty acid ester such as glycerin monostearate in addition to the above components. Further, the composition of the present invention may contain other suitable additives, for example, flame retardant, heat stabilizer, antioxidant, light stabilizer, ultraviolet absorber, lubricant, colorant, inorganic filler and/or reinforcement such as glass fiber.

The blending of a transparent resin with cupric sulfide and the thiourea and/or amide derivatives according to the present invention is not limited in the means or order, but may be easily conducted with a conventional mixer such as a heated roll, Banbury mixer or extruder.

The film or sheet of the present invention may be one produced by any conventional process. That is, it can be produced by T-die extrusion, inflation molding, calendering or compression molding.

Although the thickness of the film or sheet according to the present invention is not particularly limited, it is preferable that the thickness lie within the range of 0.01 to 10 mm. Further, the composition of the present invention may be molded into a sheet or film in a state containing a glass fiber net produced by weaving glass filament yarns in a square lattice of 5-mm intervals or a stainless steel gauze for the purpose of increasing the sheet strength or decoration.

As described above, a material which exhibits nearly uniform absorption performance over the entire near-infrared region of 800 to 2000 nm can be prepared by melt kneading a mixture comprising a transparent resin, cupric sulfide having a mean particle diameter of 12 μm or below and, if necessary, a specific thiourea derivative and/or a specific amide derivative by the above process, though no detailed mechanism of the function has been elucidated as yet.

EXAMPLE

The present invention will now be described in detail by referring to the following Examples, though the present invention is not limited by them. In the Examples, all amounts of the components added are shown by part by weight.

The transmission spectra of the obtained resin materials were determined by the use of a spectrophotometer (mfd. by Hitachi, Ltd., Type 323).

The near-infrared absorption performance of each material was evaluated based on the average of absorptivity values determined at the wavelengths of 900, 1000, 1100 and 1500 nm, i.e., the absorption performance was evaluated to be "⊚" when the average was 80% or above, "○" when 60% or above "Δ" when 30% or above, and "X" when below 30%.

The resistances of the near-infrared absorption performance to heat, humidity and light were determined as follows: heat resistance and humidity resistance: a near-infrared absorbing sheet was allowed to stand in an oven at 80° C. and 100% RH for 480 hours and examined again for near-infrared absorption performance with a spectrophotometer (at 1000 nm). The retention was evaluated based on the value obtained by calculation according the to following formula:

$$\text{retention} = \frac{100 - \text{transmittance after heating and humidification}}{100 - \text{transmittance before heating and humidification}} \times 100 \, (\%)$$

light resistance: a near-infrared absorbing sheet was irradiated with light with an UV tester (ultra-accelerated weathering tester mfd. by Dai Nippon Plastics (K.K.)) for 200 hours and examined again for near-infrared absorption performance with a spectrophotometer (at 1000 nm). The retention was evaluated based on the value obtained by calculation according to the following formula:

$$\text{retention} = \frac{100 - \text{transmittance after exposure to light}}{100 - \text{transmittance before exposure to light}} \times 100 \, (\%)$$

The heat stability was determined by molding a polycarbonate at 280° C., a polystrenic or methacrylate resin at 230° C., or a vinyl chloride or polyolefinic resin at 150° C. with a residence time of 20 minutes and examining the obtained sample for color change with a color difference meter mfd. by Nippon Denshoku Kogyo (K.K.) to determine the color difference (ΔE) by the L.a.b. method, and evaluated according to the following criteria:

⊚: excellent

○: good

Δ: no scorching (significant yellowing)

x: scorching

Examples 1 to 18

Cupric sulfide having a mean particle diameter of 8 μm and, if necessary, other additive(s) were added to 100 parts by weight of a polycarbonate resin prepared from bisphenol A according to a formulation specified in Table 1, followed by mixing in a tumbling mixer for 20 minutes. The obtained mixture was kneaded at 300° C. on a 40-mm φ extrusion molding machine and pelletized. The obtained pellets were dried and molded into a haze-free green transparent resin plate having a thickness of 3 mm on an injection molding machine.

The plates thus produced were examined for transmission spectra and the results obtained in the wavelength range of 800 to 2000 nm are given in Table 4. The plates were excellent in near-infrared absorption performance.

Examples 19 to 23

Cupric sulfide having a mean particle diameter of 8 μm and other additive(s) were added to 100 parts by weight of a polystyrene resin or acrylonitrile-styrene copolymer according to a formulation specified in Table 2, followed by mixing in a tumbling mixer for 20 minutes. The obtained mixture was kneaded at 220° C. on a 40-mmφ extrusion molding machine and pelletized. The obtained pellets were dried and molded into a haze-free green transparent resin plate having a thickness of 3 mm on an injection molding machine.

The plates thus produced were examined for transmission spectra and the results obtained in the wavelength range of 800 to 2000 nm are given in the Table 4. The plates were excellent in near-infrared absorption performance.

Examples 24 to 26

Cupric sulfide having a mean particle diameter of 8 μm and other additive(s) were added to 100 parts by weight of a methyl methacrylate resin according to a formulation specified in the Table 2, followed by mixing in a tumbling mixer for 20 minutes. The obtained mixture was kneaded at 220° C. on a 40-mmφ extrusion molding machine and pelletized. The obtained pellets were dried and molded into a haze-free green transparent resin plate having a thickness of 3 mm on an injection molding machine.

The plates thus produced were examined for transmission spectra and the results obtained in the wavelength range of 800 to 2000 nm are given in the Table 4 and 5. The plates were excellent in near-infrared absorption performance.

Examples 27 to 29

Cupric sulfide having a mean particle diameter of 8 μm and other additive(s) were added to 100 parts by weight of a vinyl chloride resin (degree of polymerization, P, : 1000), followed by the addition of 3 parts by weight of a tin stabilizer (dibutyltin maleate), 0.3 part by weight of a lubricant (stearic acid) and i part by weight of a processing aid. The obtained system was mixed in a tumbling mixer for 20 minutes, kneaded at 170° C. on a 40-mmφ extrusion molding machine and pelletized. The obtained pellets were dried and molded into a haze-free green transparent resin plate having a thickness of 3 mm on an injection molding machine.

The plates thus produced were examined for transmission spectra and the results obtained in the wavelength range of 800 to 2000 nm are given in the Table 5. The plates were excellent in near-infrared absorption performance.

Examples 30 to 34

Cupric sulfide having a mean particle diameter of 8 μm and other additive(s) were added to 100 parts by weight of an ethylene-vinyl acetate copolymer (vinyl acetate content: 15% by weight) or a low-density polyethylene resin according to a formulation specified in the Table 2, followed by mixing in a tumbling mixer for 20 minutes. The obtained mixture was kneaded on a 40-mmφ extrusion molding machine at 170° C. and pelletized. The obtained pellets were dried and molded into a haze-free green transparent resin plate having a thickness of 3 mm on an injection molding machine.

The plates thus produced were examined for transmission spectra and the results obtained in the wavelength range of 800 to 2000 nm are given in the Table 5. The plates were excellent in near-infrared absorption performance.

Example 35

The same components as those used in the Example 2 were mixed together in a tumbling mixer for 20 minutes and molded into a sheet having a thickness of 1 mm on a 40-mmφ extrusion molding machine at 300° C. by the T-die molding process. The temperature of the cooling roll was 120° C.

The obtained plate was examined for transmission spectrum and the result obtained in the wavelength range of 800 to 2000 nm is given in the Table 5. The plate was excellent in near-infrared absorption performance.

Comparative Examples 1 to 10

Cupric sulfide or metallic copper having a mean particle diameter of 8 μm or other additive was added to 100 pars by weight of a resin according to a formulation specified in Table 3, followed by mixing in a tumbling mixer for 20 minutes. The obtained mixture was kneaded on a 40-mmφ extrusion molding machine at 300° C. and pelletized. The obtained pellets were dried and molded into a haze-free green transparent resin plate having a thickness of 3 mm on an injection molding machine.

The plates thus produced were examined for transmission spectra and the results obtained in the wavelength range of 800 to 2000 nm are given in the Table 5. The near-infrared absorption performance of the plates were all 30% or below.

It is apparent from the results given in the Tables 4 and 5 that the transparent resin sheets containing cupric sulfide are excellent in near-infrared absorption performance. Further, it can be understood that this excellent near-infrared absorption performance is scarcely lowered even by heating, humidifying or exposure to light, thus being highly resistant to changes in the environmental condition in handling and storage.

The transparent resin sheet containing only metallic copper did not exhibit any near-infrared absorption performance in substance.

In Tables, PC is polycarbonate, PS is polystyrene, PMMA is polymethylmethacrylate and PVC is polyvinyl chloride.

TABLE 1

Formulation of thermoplastic resin composition

| Ex. No. | cupric sulfide | thiourea der. | amide der. | resin |
|---|---|---|---|---|
| 1 | 0.06 | | | PC 100 |
| 2 | 0.1 | | | PC 100 |
| 3 | 1.0 | | | PC 100 |
| 4 | 0.06 | 1,3-diphenylthiourea 0.06 | | PC 100 |
| 5 | 0.1 | 1,3-diphenylthiourea 0.06 | | PC 100 |
| 6 | 1.0 | 1,3-diphenylthiourea 0.06 | | PC 100 |
| 7 | 0.1 | 1,3-diphenylthiourea 0.01 | | PC 160 |
| 8 | 0.1 | 1,3-diphenylthiourea 0.1 | | PC 100 |
| 9 | 0.1 | 1,3-diethylthiourea 0.06 | | PC 100 |
| 10 | 0.1 | 1,3-diethylthiourea 0.06 | | PC 100 |
| 11 | 0.1 | | N-phenylstearamide 0.01 | PC 100 |
| 12 | 0.1 | | N-phenylstearamide 0.06 | PC 100 |
| 13 | 0.1 | | N-phenylstearamide 0.1 | PC 100 |
| 14 | 0.1 | | N-phenylbenzamide 0.06 | PC 100 |
| 15 | 0.1 | 1,3-diphenylthiourea 0.005 | N-phenylstearamide 0.005 | PC 100 |
| 16 | 0.1 | 1,3-diphenylthiourea 0.03 | N-phenylstearamide 0.03 | PC 100 |
| 17 | 0.1 | 1,3-diphenylthiourea 0.05 | N-phenylstearamide 0.05 | PC 100 |
| 18 | 0.1 | 1,3-diphenylthiourea 0.03 | N-phenylbenzamide 0.03 | PC 100 |

TABLE 2

Formulation of thermoplastic resin composition

| Ex. No. | cupric sulfide | thiourea der. | amide der. | resin |
|---|---|---|---|---|
| 19 | 0.1 | 1,3-diphenylthiourea 0.06 | | PS 100 |
| 20 | 0.1 | | N-phenylstearamide 0.06 | PS 100 |
| 21 | 0.1 | 1,3-diphenylthiourea 0.03 | N-phenylstearamide 0.03 | PS 100 |
| 22 | 0.1 | 1,3-diphenylthiourea 0.06 | | AS 100 |
| 23 | 0.1 | | N-phenylstearamide 0.06 | AS 100 |
| 24 | 0.1 | 1,3-diphenylthiourea 0.06 | | PMMA 100 |
| 25 | 0.1 | | N-phenylbenzamide 0.06 | PMMA 100 |
| 26 | 0.1 | 1,3-diphenylthiourea 0.03 | N-phenylstearamide 0.03 | PMMA 100 |
| 27 | 0.1 | 1,3-diphenylthiourea 0.06 | | PVC 100 |
| 28 | 0.1 | | N-phenylstearamide 0.06 | PVC 100 |
| 29 | 0.1 | 1,3-diphenylthiourea 0.03 | N-phenylstearamide 0.03 | PVC 100 |
| 30 | 0.1 | 1,3-diphenylthiourea 0.06 | | EVA(15) 100 |
| 31 | 0.1 | | N-phenylstearamide 0.06 | EVA(15) 100 |
| 32 | 0.1 | 1,3-diphenylthiourea 0.03 | N-phenylstearamide 0.03 | EVA(15) 100 |
| 33 | 0.1 | 1,3-diphenylthiourea 0.06 | | LDPE 100 |
| 34 | 0.1 | | N-phenylstearamide 0.06 | LDPE 100 |

AS: acrylonitrile-styrene copolymer
EVA(15): ethylene-vinyl acetate copolymer having a vinyl acetate content of 1.5% by weight
LDPE: low-density polyethylene

TABLE 3

Formulation of thermoplastic resin composition

| Comp. Ex. No. | Formulation (pt. by wt.) | | |
|---|---|---|---|
| | cupric sulfide/metallic copper | thiourea der./amide der. | resin |
| 1 | cupric sulfide 0.005 | | PC 100 |
| 2 | cupric sulfide 0.005 | | PS 100 |
| 3 | cupric sulfide 0.005 | | PMMA 100 |
| 4 | metallic copper 0.1 | | PC 100 |
| 5 | | 1,3-diphenylthiourea 0.06 | PC 100 |
| 6 | | 1,3-diphenylthiourea 0.06 | PS 100 |
| 7 | | 1,3-diphenylthiourea 0.06 | PMMA 100 |
| 8 | | N-phenylstearamide 0.06 | PC 100 |
| 9 | | N-phenylstearamide 0.06 | PS 100 |
| 10 | | N-phenylstearamide 0.06 | PMMA 100 |

TABLE 4

Results of evaluation of near-infrared absorbing resin

| | Unit | Ex. 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| near-infrared absorption performance | — | ○ | ● | ● | ○ | ● | ● | ○ | ● | ● | ● | ○ | ● | ● | ● | ○ | ● | ○ | ● | ● | ● | ● | ● | ● | ● |
| resistance to heat and humidity | % | 95 | 95 | 94 | 85 | 83 | 90 | 91 | 85 | 83 | 91 | 92 | 85 | 92 | 90 | 85 | 92 | 91 | 90 | 92 | 91 | 92 | 90 | 89 | 90 |
| light resistance | % | 91 | 90 | 90 | 86 | 86 | 90 | 91 | 86 | 86 | 87 | 90 | 86 | 85 | 95 | 80 | 90 | 90 | 87 | 90 | 90 | 90 | 89 | 88 | 89 |
| heat stability | ΔE | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |

TABLE 5

Results of evaluation near-infrared absorbing resin

| | Unit | Ex. 25 | 26 | 27 | 28 | 29 | 30 | 31 | 32 | 33 | 34 | 35 | Comp. Ex. 1 | 2 | 3 | 4 | 5 | 6 | 7 | 8 | 9 | 10 |
|---|---|---|---|---|---|---|---|---|---|---|---|---|---|---|---|---|---|---|---|---|---|---|
| near-infrared absorption perform | — | ● | ● | ● | ● | ● | ● | ● | ● | ● | ● | ● | x | x | x | x | x | x | x | x | x | x |
| resistance to heat and humidity | % | 95 | 85 | 91 | 90 | 90 | 90 | 85 | 92 | 92 | 91 | 90 | — | — | — | — | — | — | — | — | — | — |
| light resistance | % | 91 | 80 | 90 | 86 | 90 | 90 | 80 | 91 | 90 | 90 | 86 | — | — | — | — | — | — | — | — | — | — |
| heat stability | ΔE | ○ | ○ | ○ | ○ | ○ | ○ | ○ | ○ | ○ | ○ | ○ | ○ | ○ | ○ | ○ | ○ | ○ | ○ | ○ | ○ | ○ |

As described above, the present invention relates to a near-infrared absorbing transparent resin composition prepared by melt-kneading a mixture comprising 100 parts by weight of a transparent resin, 0.01 to 5 parts by weight of cupric sulfide and, if necessary, further 0.01 to 1 part by weight of a specific thiourea derivative and/or 0.01 to 1 part by weight of a specific amide derivative, and a molded article of a near-infrared absorbing transparent resin produced by molding the composition into a sheet or film. The obtained resin materials are free from unstableness such as fading or photochromism causing fading after being left to stand in a dark place for a long period, and exhibit excellent near-infrared absorption performance, so that they are industrially useful as an optical filter, heat absorbing glazing material and so forth.

Further, the obtained near-infrared absorbing sheet exhibits high absorptivity over the entire near-infrared region of 800 to 2000 nm. By utilizing this property, the sheet can be utilized as an optical material such as a near-infrared filter, a recording material, a heat ray shielding material, a heat storage material, a near-infrared sensor and so forth.

What we claim is:

1. A transparent resin composition having excellent near-infrared absorption which comprises (A) 100 parts by weight of a transparent resin selected from the group consisting of a polycarbonate, styrene, a styrene copolymer, polymethyl(meth)acrylate and a polymethy(meth)acrylate copolymer and (B) 0.01 to 5 parts by weight of cupric sulfide, said cupric sulfide having been kneaded into said resin such that it is dispersed therein and said composition exhibiting nearly uniform absorption over the near infrared region of 800 to 2000 nm.

2. A sheet of film having excellent near-infrared absorption which comprises (A) 100 parts by weight of a transparent resin selected from the group consisting of a polycarbonate, styrene, a styrene copolymer, polymethyl(meth) acrylate and a polymethl(meth) acrylate copolymer and (B) 0.01 to 5 parts by weight of cupric sulfide, said cupric sulfide having been kneaded into said resin such that it is dispersed therein and said composition exhibiting nearly uniform absorption over the near infrared region of 800 to 2000 nm.

3. The composition as claimed in claim 1, which further comprises (C) 0.001 to 1 part by weight of at least one thiourea derivative selected from the group consisting of those represented by the formula (I):

(I)

wherein $R_1$, $R_2$ and $R_3$ each represent a monovalent group selected from the group consisting of hydrogen, alkyl, cycloalkyl, aryl and aralkyl groups and residues of 5- and 6-membered heterocycles, each of which may have one or more substituents, or $R_1$ and $R_2$ or $R_2$ and $R_3$ may be united together to form a ring, and/or 0.001 to 1 part by weight of at least one amide derivative selected from the group consisting of those represented by the formula (II):

(II)

wherein $R_4$ and $R_5$ each represent a monovalent group selected from the group consisting of hydrogen, alkyl, alkenyl, cycloalkyl, aryl and aralkyl groups and residues of 5- and 6-membered heterocycles, or $R_4$ as defined above and $R_5$ also represents an alkoxy group, each of these monovalent groups may have one or more substituents, or $R_4$ and $R_5$ may be united together to form a ring.

4. The composition as claimed in claim 1, wherein the cupric sulfide has a mean particle diameter of 12 μm or below and does not contain any particles having a diameter of 20 μm or above.

5. The composition as claimed in claim 1, in which cupric sulfide has an average size of 0.2 to 12 microns.

6. The composition as claimed in claim 1, further comprising a dispersant selected from the group consisting of a sorbitan/fatty acid ester and a glycerin/fatty acid ester.

7. The composition of claim 6, wherein said sorbitan/fatty acid ester is sorbitan monostearate.

8. The composition of claim 6, wherein said glycerin/fatty acid ester is glycerin monostearate.

* * * * *